Dec. 11, 1956  H. S. YOUNG  2,773,501
DRILL ELEMENT FOR EFFECTING INTRAOSSEOUS
FLUID INJECTIONS AND THE LIKE
Original Filed Jan. 26, 1955

INVENTOR
Harold S. Young,

BY

ATTORNEY

United States Patent Office 2,773,501
Patented Dec. 11, 1956

2,773,501

DRILL ELEMENT FOR EFFECTING INTRAOSSEOUS FLUID INJECTIONS AND THE LIKE

Harold S. Young, Washington, D. C.

Original application January 26, 1955, Serial No. 484,136. Divided and this application March 10, 1955, Serial No. 493,393

1 Claim. (Cl. 128—221)

This invention relates to dental instruments and has for its principal object the provision of an improved drill element which is especially adapted for use in connection with the injection of fluids into, or their withdrawal from, the medullary section of the maxillary or other bone structures. The said drill has been devised primarily for use in connection with the dental instrument disclosed and claimed in my prior U. S. patent application Serial No. 484,136, filed January 26, 1955, of which the present application is a division, but as will be readily apparent to those skilled in the art the element is by no means limited to employment with that instrument exclusively.

One of the principal fields in which the present drill may be used to advantage is in effecting intraosseous anesthesia of teeth preparatory to the performance of dental operations thereon. As set forth in said prior application, the principle of this type of anesthesia has been known for many years, and it has been recognized as providing the most rapid and certain method of securing insensibility of the dental pulp or nerve tissue. Notwithstanding this and other advantages, its use has been relatively limited, largely because it has been somewhat more difficult to effect than the more generally employed infiltration and nerve block methods.

That is to say, under the technique originally devised a few drops of an anesthetic fluid is injected by means of a hypodermic syringe into the mucous membrane adjacent the tooth to be worked on, and then a small hole is drilled through the hard cortical layer of the alveolar process of the maxillary bone. This hole is produced by means of a conventional dental drill, and is located between the root of the tooth to be anesthetized and that of the adjoining tooth, near the root apices. Upon penetration of the drill to the soft medullary section of the bone it is withdrawn from the hole and the desired dosage of anesthetic fluid is injected into said bone section by means of the hypodermic syringe, the needle of which is inserted through the drilled hole. The hole however normally is only about ½₂ of an inch in diameter, which makes it extremely difficult to locate beneath the gum tissue once the drill has been withdrawn; and unless the syringe needle be of substantially the same diameter as the hole, much of the fluid will back out of the hole around the drill.

Attempts have been made to improve the above outlined procedure, and it has been previously recognized that if a hollow or tubular drill were employed through which the anesthetic fluid could be injected without the necessity for withdrawal from the hole, the technique would be appreciably simplified with resultant wider use of this type of anesthesia. So far as I am aware however, none of the drill elements heretofore proposed for this purpose has proven very satisfactory, for unless a pin or stylus is positioned in the drill duct during the drilling operation, the cuttings enter the duct and clog the same to the point where it is difficult if not impossible to force the anesthetic fluid through it. Of course, if a stylus be employed in the duct to avoid such clogging, it must be withdrawn in some manner before the injection can be made, thus complicating the procedure and offsetting to a substantial extent the advantage accruing from the use of a hollow drill.

The drill element of the present invention provides a tubular drill for use in dental and surgical procedures such as above described, in which clogging of the fluid duct is avoided without the necessity for employment of a pin or stylus in the duct.

Although as previously indicated the present drill is susceptible of use with instruments other than that disclosed in my said prior application, for convenience it has been illustrated in association with such an instrument in the accompanying drawing constituting a part of this specification, in which.

Figure 1:
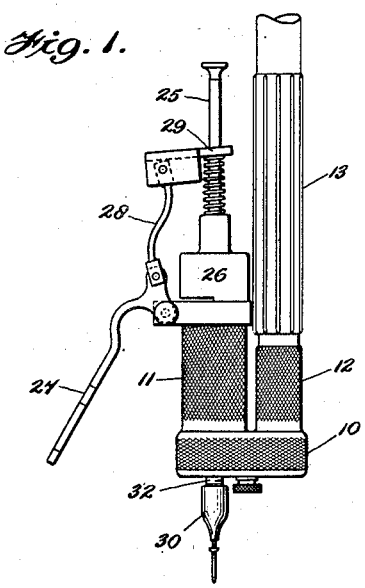
Figure 1 is a side elevational view of such an instrument, attached to a conventional dental hand-piece and equipped with one form of drill element constructed and arranged in accordance with this invention.
Figure 2:
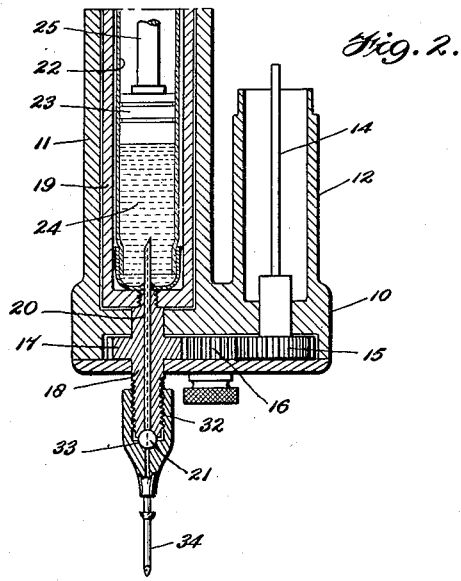
Fig. 2 is a vertical sectional view, on a somewhat larger scale, of the lower portion of said instrument and drill.

The dental instrument shown in Figs. 1 and 2 comprises a body member 10 having a pair of parallel tubular barrels 11 and 12, into the latter of which the nose of a dental hand-piece 13 is inserted and secured. The chuck of said hand-piece receives and grips a spindle 14 that is journaled in the body member 10 axially of the barrel 12 and carries a gear 15 at its lower end which, through an idler gear 16, drives a gear 17 rigidly carried by a shaft 18 that is journaled in said body member axially of its barrel 11. The upper end of said shaft is secured to an inverted thimble member 19 which is rotatably disposed in the barrel 11, and said shaft is provided with an axial bore in which is removably mounted a tubular pin 20 having a spherical head 21 at its lower end. The upper portion of this pin extends into the chamber of the thimble member 19, whereby it may puncture the soft metal end member of a standard anesthetic-containing carpule 22 when the latter is inserted into said chamber, as shown in Fig. 2. Such carpules are provided with a resilient closure plug 23 slidably mounted in their upper portion, which plug may be advanced longitudinally of the carpule to expel the anesthetic fluid 24 therefrom through the tubular pin 20. Step-by-step advancement of the plug 23 is effected by means of a rod 25 slidably mounted in the cap member 26 of the barrel 11 and volitionally operable by a finger lever 27, link 28, and intermittent grip device 29, all as fully disclosed in my said prior application.

Figure 3:
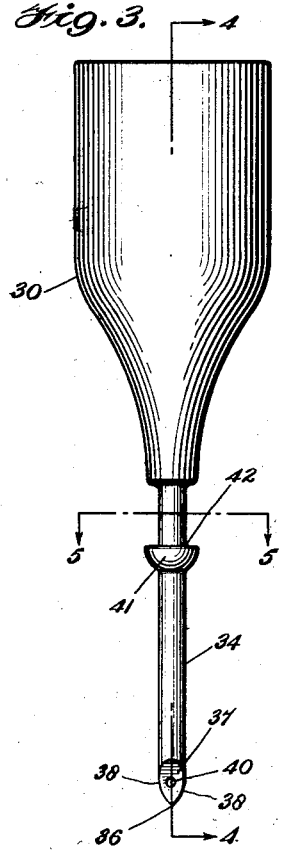
Fig. 3 is an elevational view of the drill element per se, on a greatly enlarged scale.

The drill element constituting the present invention comprises a body portion 30 having a threaded socket 31 for readily detachable securement to the threaded lower end 32 of the gear shaft 18, and the bottom of such socket is provided with a hemispherical seat 33 adapted to receive and effect sealing engagement with the lower portion of the spherical head 21 of the tubular pin 20, see Fig. 2. An elongated stem 34 of small diameter extends from the lower end of the body 30, which stem has its lower end rounded or tapered as at 35 to an axially located point 36. At one side however, this pointed end portion of the stem is cut or ground off at an acute angle to the stem axis, thereby providing a flat beveled face 37 flanked by cutting edges 38 diverging upwards from said point, see Fig. 3. The body and stem are provided with an axial duct 39 extending from the hemispherical seat 33 of the body to adjacent the tip 36 of the stem, where the duct terminates in an angular portion 40 extending substantially perpendicularly to and opening through the beveled face 37 intermediate the cutting edges 38. When the drill element is threaded onto the instrument shaft 18 as shown in Fig. 2, the upper end of the duct is in communication with the passage of the tubular pin 20, and the head 21 of said pin is firmly held in the seat 33 and a companion seat formed in the end face of the shaft 18, thereby effectively sealing the joint between the duct and passage against escape of the anesthetic fluid at this point.

A short distance below the juncture of the stem 34 with the body 30, the stem is provided with a stop and sealing flange 41, the upper face of which is normal to the stem axis and provides a sharp corner 42 at its juncture with the stem. The lower surface of said flange is curved or tapered as at 43 and through engagement with the gum when the drill breaks through the cortical layer of the bone, serves to limit the penetration of the drill into the medullary section thereof, and also seals the hole against escape of the anesthetic fluid around the outside of the drill.

Figure 4:
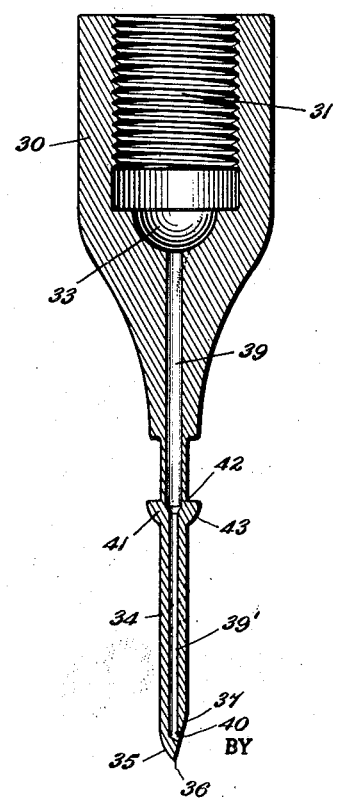
Fig. 4 is a vertical sectional view on the plane indicated by the line 4—4 in Fig. 3, looking in the direction of the arrows.
Figure 5:
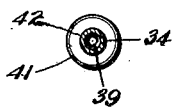
Fig. 5 is a cross sectional view on the plane indicated by the line 5—5 in Fig. 3, looking down.

Since in practice the drill stems 34 are of a diameter on the order of $\frac{1}{32}$ of an inch, there is appreciable danger of their being broken in use. To localize such breakage if and when it occurs, in the form shown in Figs. 3 and 4 the stem is of uniform diameter throughout its length but that portion 39' of its axial duct that extends from the flange 41 to the drill point is made of lesser diameter than the portion of the duct above said flange. Thus, the stem wall throughout the latter portion is thinner and weaker than in the lower section of the drill, with the weakest point being at the sharp corner 42 where the flange 41 joins the stem, and as a result it is practically certain that any breakage which may occur will take place at this point.

Figure 6:
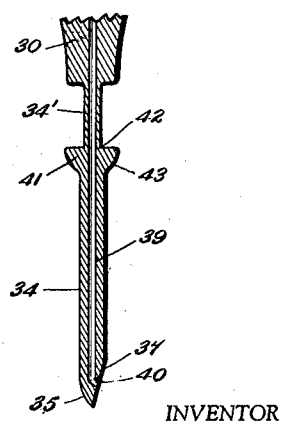
Fig. 6 is a fragmentary sectional view similar to Fig. 4, illustrating a slightly modified form of drill construction.

The same result may also be accomplished by the slightly modified form of the drill shown in Fig. 6, wherein the diameter of the duct 39 is uniform throughout the length of the element but the diameter of that portion 34' of the stem between the flange 41 and body 30 is made smaller, thus weakening the stem above the flange. Of course, a combination of the two constructions may be employed if desired. In any case, if breakage occurs the flange 41 will be outside the gum tissue and the separated portion of the drill stem may be readily extracted from the hole by merely gripping the flange and withdrawing the broken stem section.

By forming the pointed end section of the drill in the manner shown and described, and providing the duct 39 with the angularly extending terminal portion 40 opening through the beveled face 37 at substantially right angles to the plane thereof and intermediate the cutting edges 38, when rotated by the shaft 18 the element will rapidly penetrate the hard cortical layer of the bone while at the same time the cuttings will be substantially completely excluded from the duct 39 so that the fluid 24 may freely pass therethrough when the finger lever 27 is manipulated.

What is claimed is:

An anti-clogging tubular dental drill element for use in sequentially effecting penetration of the hard outer layer of a bone and the passage of a fluid to or from the medullary section thereof, said drill element comprising a body member arranged for ready attachment to a power driven rotating means, said body member having a stem extending axially therefrom, the terminal portion of which stem is tapered to a point and is provided with a beveled flat face extending at an acute angle to the axis of the stem and the lateral boundaries of which face provide rotationally operative bone-cutting edges extending from said point, said stem also having an axial fluid duct provided with a sharply angular terminal portion adjacent said point which opens through said flat face between said cutting edges, such terminal duct portion extending substantially perpendicularly to said face whereby to exclude drill cuttings from the duct.

References Cited in the file of this patent

UNITED STATES PATENTS

| | | |
|---|---|---|
| 561,059 | Mitchell et al. | May 26, 1896 |
| 1,272,104 | Reithmueller | July 9, 1918 |
| 1,274,081 | Riethmueller | July 9, 1918 |
| 1,465,851 | Kress | Aug. 21, 1923 |
| 2,562,129 | Scherer et al. | July 24, 1951 |

FOREIGN PATENTS

| | | |
|---|---|---|
| 291,315 | Great Britain | May 31, 1928 |
| 450,331 | Italy | July 15, 1949 |